United States Patent [19]

Neff

[11] 4,432,449

[45] Feb. 21, 1984

[54] LOG CUTTING DEVICE HAVING LOG SHIFTING MEANS

[76] Inventor: Leslie A. Neff, 2020 W. 15th, Emporia, Kans. 66801

[21] Appl. No.: 334,464

[22] Filed: Dec. 28, 1981

Related U.S. Application Data

[62] Division of Ser. No. 119,403, Feb. 7, 1980, Pat. No. 4,331,052.

[51] Int. Cl.³ .............................................. B65G 25/00

[52] U.S. Cl. .................................... 198/777; 83/435.1

[58] Field of Search .................................. 83/707-730, 83/435.1, 928; 198/456, 773, 774, 777, 739; 414/14, 16, 23

[56] References Cited

U.S. PATENT DOCUMENTS 1,576,025 3/1926 Baumhover .......................... 83/717

3,724,684 4/1973 Butler ............................ 198/739 X

FOREIGN PATENT DOCUMENTS 15113 of 1928 Australia ............................... 83/713

*Primary Examiner*—James M. Meister

*Attorney, Agent, or Firm*—Schmidt, Johnson, Hovey & Williams

[57] ABSTRACT

A one man operable, mobile, field usable log cutting device is provided for quickly and easily loading, handling and transversely cutting of heavy logs to yield finished log segments or discs. The device includes a rotatable, powered saw blade along with an elevated, shiftable, log support for manually moving a supported log into a saw blade for cutting purposes. A manually operable, pivotal, knee-action log advancer is also provided for selective lifting and axial shifting of a log towards a limit stop for determining disc thickness. As disc-like log segments are successively cut, they fall by gravity towards an underlying conveyor for transporting the segments away from the device; conveyor damage from falling segments is prevented through use of a pivotal, spring cushioned, basket-like log segment catcher disposed below the saw blade which engages the falling log segments, turns the same and safely deposits the segments onto the conveyor. The device preferably includes a pair of spaced, laterally extending, log-engaging slides to facilitate initial winch-powered log loading, as well as a vertically shiftable log-engaging support adjacent the cutting blade for firmly engaging even irregular logs adjacent the region thereof to be cut.

3 Claims, 15 Drawing Figures

Fig.4.
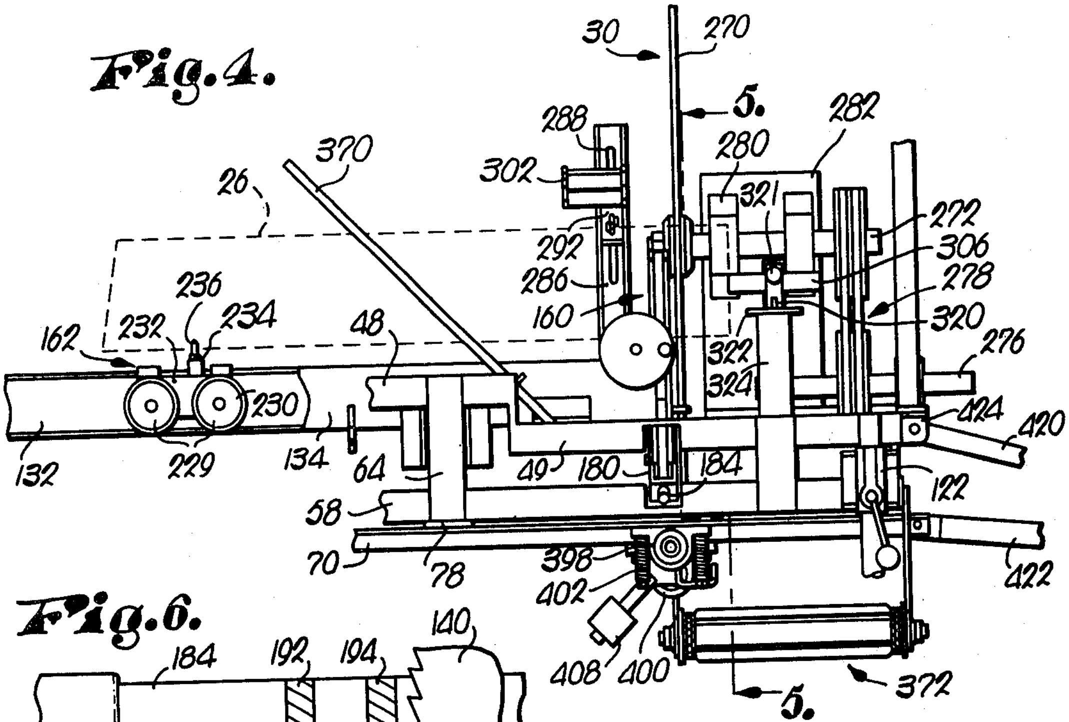
Fig.6.
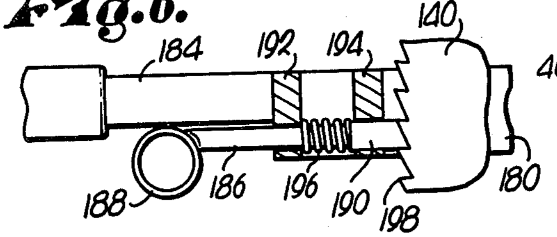
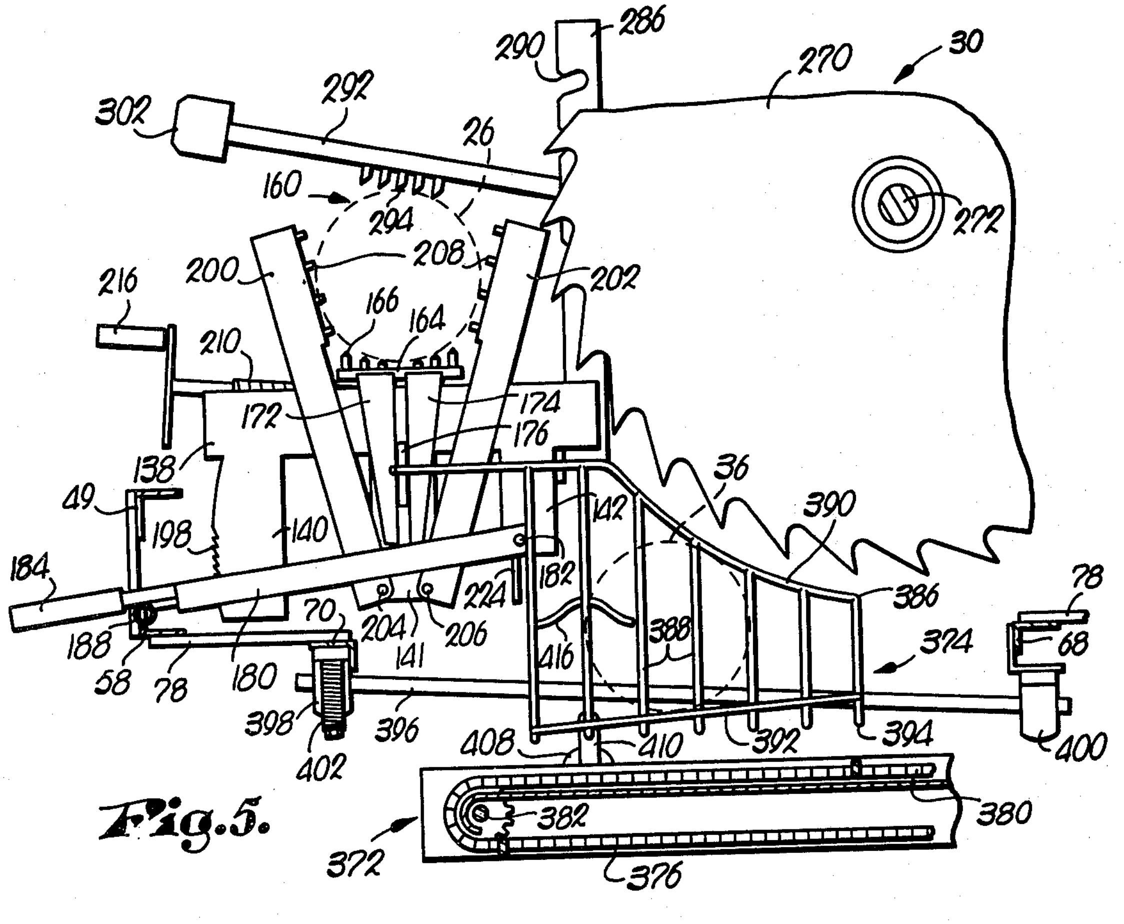
Fig.5.

LOG CUTTING DEVICE HAVING LOG SHIFTING MEANS

This is a division of application Ser. No. 06/119,403 filed on Feb. 7, 1980, now U.S. Pat. No. 4,331,052.

BACKGROUND OF THE INVENTION

1. Field of the Invention

The present invention is concerned with a compact, mobile log cutting device which can be transported to a field site for cutting of logs into discrete, disc-like segments. More particularly, it is concerned with such a device which includes apparatus for sequentially elevating and loading a log into a supported position above ground, for successively axially shifting the log to a cutting position adjacent a rotatable saw blade forming a part of the device, means for cutting segments from the log, and finally means for quickly and safely transporting the cut segments from the device for storage or use; in this fashion the complete log cutting operation can be handled by but a single operator to greatly enhance efficiency and thus lower costs.

2. Description of the Prior Art

Cutting of wood for use as fuel has been a practice of mankind since the dawn of time. The time-honored technique in this regard is to simply chop down a tree with an ax or the like, remove the limbs from the trunk thereof, and finally to cut and split the trunk and limbs into convenient burnable lengths. While such a technique is traditional, it is extremely time consuming and laborious. This is true even when use is made of relatively recent expedients such as chain saws or other powered cutting aids.

Attempts have been made in the past to provide machines of various types for sawing of logs into burnable lengths. Examples of such devices are illustrated in U.S. Pat. Nos. 412,432, 804,073, 2,039,017 and 3,677,312. While such units have heretofore been disclosed in the patent art, as a practical matter they have not solved the problem of providing a truly mobile, compact, one man operated unit for handling and sawing of logs. In some cases the prior devices are deficient in that excessive manual labor is required for loading and handling of the logs whereas in other instances the cut log sections must be manually handled. As can be appreciated, these deficiencies greatly detract from the usefulness of the prior log cutting units.

SUMMARY OF THE INVENTION

The above described problems are in large measure solved by the present invention which provides a completely mobile, compact device for cutting of logs into short pieces, particularly disc-like segments. To this end, the device of the invention is provided with means for supporting an elongated log in an elevated position above the ground, means for elevating and loading a log onto the log supporting means, means preferably in the form of a rotatable saw blade for cutting of the log generally transverse to the longitudinal axis thereof to present log segments, and means for receiving the cut segment in order to convey the same away from the device for storage or use. In addition, the device of the invention also includes greatly improved means for selectively shifting the log in an axial direction towards the cutting means so that the log can be sequentially shifted to a cutting position. In this fashion the device hereof greatly facilitates all aspects of log handling, cutting and removal.

In particularly preferred forms, the log shifting means of the invention includes a pair of elongated, log-engaging elements each comprising a pair of pivotally interconnected members, and spring means for biasing the respective members to an axially aligned relationship. An operating handle is coupled to the elements for pivoting thereof in such that the log is initially lifted and shifted forwardly, whereupon the knee-like interconnection between the members allows the elements to be folded back upon themselves so that the shifter can be retracted to its original starting position.

In further preferred forms of the invention, the log cutting device is provided with log-supporting means including a first log-engaging support proximal to the cutting blade, along with apparatus for selective vertical shifting of the support. In this manner firm engagement can be maintained with a log to facilitate cutting, even in the event that a given log is of irregular configuration.

Automated and safe removal and transport of cut log segments is provided in the present invention through use of a conveyor disposed below the cutting blade for transporting cut segments away from the device, in conjunction with means located between the blade and conveyor for receiving a cut log segment and depositing the segment onto the conveyor without damaging the latter. Preferably, a log segment catcher is provided which presents, in the upright rest position thereof, a segment-engaging surface. The catcher is pivotally supported for pivoting thereof about a generally horizontal axis such that, when the falling log segment engages the catcher, it is pivoted in order to turn the segment and deposit the same, under the influence of gravity, onto the conveyor in a flat condition.

Finally, the preferred log cutting device of the invention includes improved structure for elevating and loading a log onto the device in the form of at least one (and preferably a plurality of) log-engaging slides mounted in a laterally extending relationship between the ground and a point above a log support of the device. An elongated stop bar is spaced laterally from the uppermost end of the slide and above the log support in order to prevent unrestricted lateral movement of a log drawn up and off of the slide. Means preferably in the form of an overhead winch is also provided for drawing a log up the slide. Advantageously, the upper and lower terminal sections of the slide are pivoted. In the case of the lower terminal section, pivotal mounting thereof allows the slide to engage the ground irrespective of depressions or other irregularities of depressions or other irregularities. Pivotal mounting of the upper terminal section of the slide allows the section to be pivoted to a log-clearing position allowing a log to be lowered onto the underlying log support after it has been winched to an elevated position.

BRIEF DESCRIPTION OF THE DRAWINGS

FIG. 4 is a fragmentary side elevational view of the side of the device opposite to that illustrated in FIG. 1, with parts broken away for clarity;

FIG. 5 is a fragmentary vertical sectional view taken along line 5—5 of FIG. 4;

FIG. 6 is an enlarged fragmentary vertical sectional view illustrating the positioning latch provided with the forward log-engaging support;

DESCRIPTION OF THE PREFERRED EMBODIMENT

Figure 1:
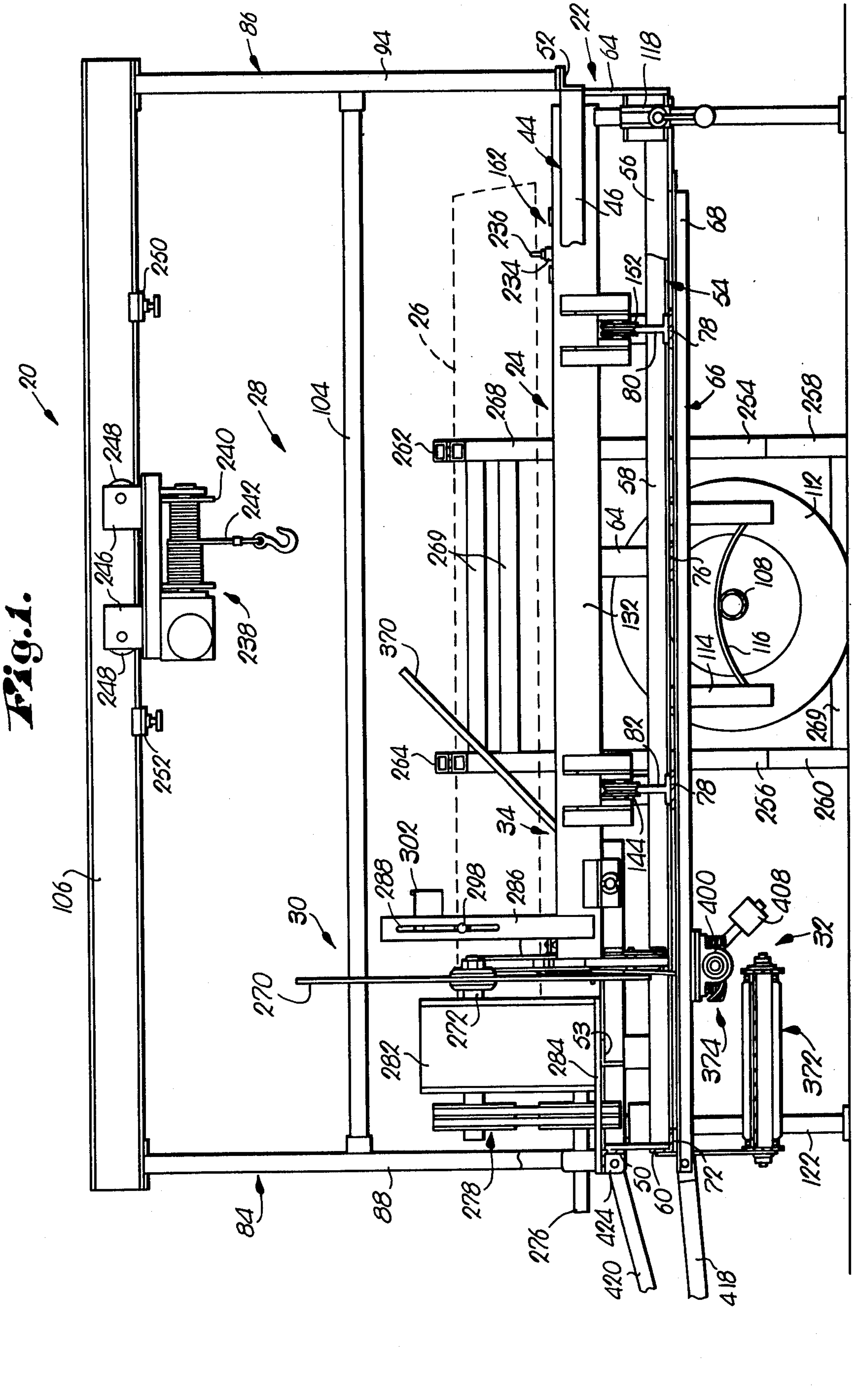
FIG. 1 is a side elevational view with parts broken away for clarity illustrating the log cutting device of the invention.

Turning now to the drawings, a log cutting device 20 in accordance with the invention is illustrated. Broadly speaking, the device 20 includes a mobile supporting frame assembly 22, means 24 for supporting an elongated log 26 in an elevated position on the device, means 28 for elevating and loading the log 26 onto the supporting means 24, cutting means 30 for cutting the log 26 into relatively short, disc-like segments, and means broadly referred to by the numeral 32 for receiving cut log segments and conveying the same away from device 20. In addition, the log cutting device hereof includes means 34 for selectively shifting log 26 in an axial direction toward cutting means 30 and into a cutting position relative thereto.

Figure 15:
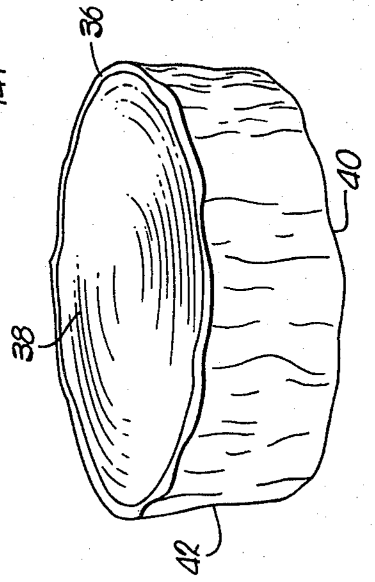
FIG. 15 is a perspective view of a typical log segment.
Figure 14:
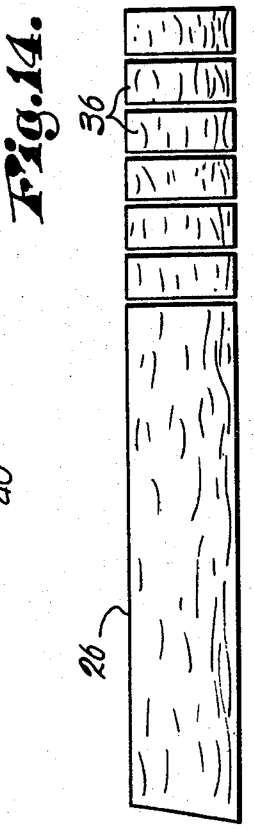
FIG. 14 is an elevational view of a typical log, with one end thereof cut to form a plurality of log segments.

It is to be understood that the present invention is particularly designed for handling and cutting an elongated log 26 to present a series of short, disc or wafer-like segments 36. That is to say, the device 30 is operable to successively cut the log 26 transverse to the longitudinal axis thereof to present discs 36 (see FIG. 15) haing a pair of substantially planar and parallel opposed faces 38, 40, and a continuous, relatively short sidewall 42. It has been determined that log segments of this configuration dry rapidly, have excellent burning qualities, and can be handled by the user without difficulty.

In more detail, and again referring to FIGS. 1-3, frame assembly 22 includes an outermost, rectangular metallic main frame 44 made up of identical, elongated, spaced side rails 46, 48 which terminate, at their forward ends, in short sections 49 somewhat lower than the main portions of the side rails 46, 48 (see FIG. 5). Front and rear rails 50, 52 complete the outer portion of the frame 44. A secondary cross rail 53 adjacent and parallel to rail 50 is also provided for equipment mounting purposes. Similarly, a lower frame 54 is provided beneath the frame 44 and includes elongated side rails 56, 58, and front and rear rails 60, 62. The frames 44, 54 are interconnected by means of a series of vertically extending connection plates 64 spaced about the perimeter of the superposed frames.

An inner sub-frame 66 also forms a part of assembly 22, and is located at a level slightly below the lower main frame 54. The sub-frame 66 includes a pair of spaced, elongated side rails 68, 70 which respectively extend from a point inboard of the rear rails 52, 62 to the extreme forward end of the device 20. At this forward end, the rails 68, 70 are connected to front rail 60, through use of appropriate spacer blocks 72. The rearward end of sub-frame 66 is defined by a cross rail 74 spaced inwardly from the rails 52, 64 and connected to rails 68, 70. Finally, a plurality of spaced, horizontal connection plates 76, 78 extend from the lower frame 54 and connect to sub-frame 66 for supporting the latter.

Figure 2:
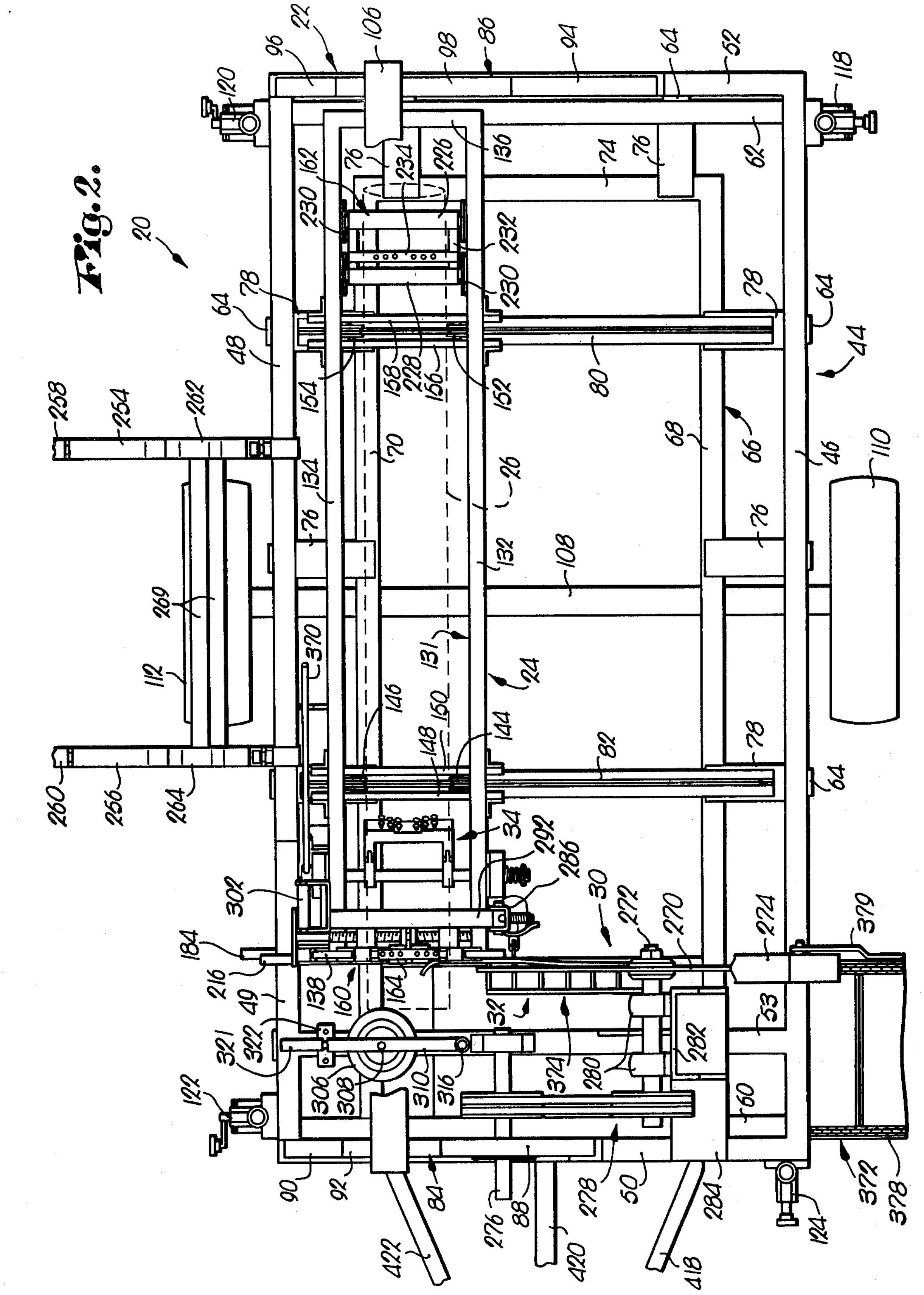
FIG. 2 is a top plan view of the machine, again with parts broken away to illustrate the details of construction of the device.

Referring particularly to FIGS. 1 and 2, it will be seen that a pair of elongated metallic frame members 80, 82 of inverted tee configuration respectively span and are connected to the opposed pairs of connection plates 78. The purpose of these members 80, 82 will be explained hereinafter.

Figure 3:
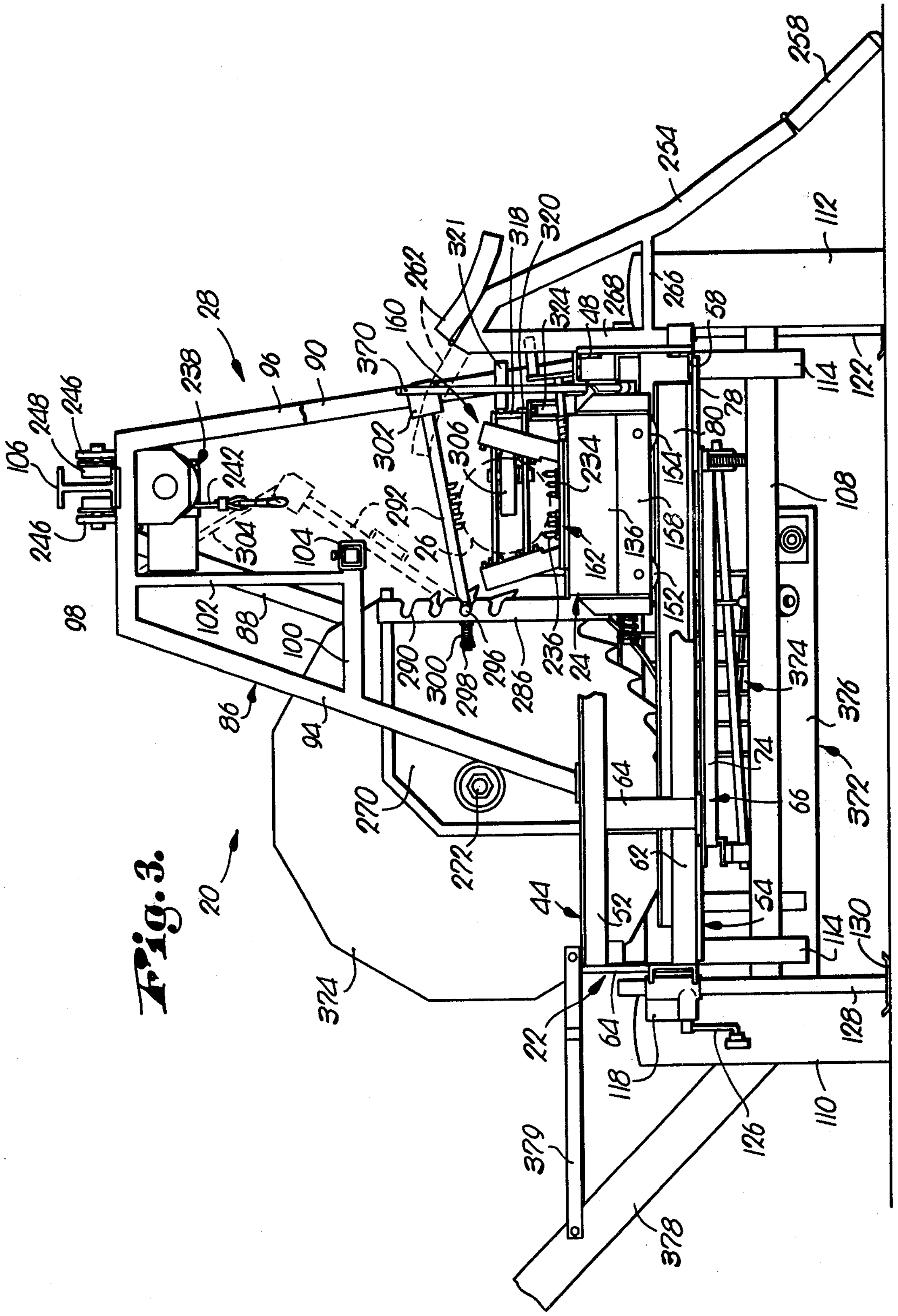
FIG. 3 is a rear elevational view of the device, with parts of the frame assembly broken away for clarity.

Frame assembly 22 also includes front and rear A-frame assemblies 84, 86 respectively mounted upon the rails 50, 52. Referring specifically to FIGS. 2 and 3, it will be seen that A-frame 84 includes a pair of upwardly extending, converging, obliquely oriented legs 88, 90, and a horizontally extending upper rail 92 interconnecting the legs 88, 90. The A-frame 84 further includes a short, inwardly extending stub (not shown) connected to leg 88 midway between the ends thereof and extending laterally therefrom towards leg 90. A-frame 86 is of similar construction and includes a pair of upright, converging, obliquely oriented legs 94 and 96 respectively secured to rail 52 and joined at the upper ends thereof by a cross piece 98. A generally horizontal, inwardly extending member 100 is coupled to the leg 94 at the approximate level of the aforementioned stub, and is connected to an upright member 102 which depends from cross piece 98. An elongated, log-engaging element 104 extends between the A-frames 84, 86 and is connected to the latter, respectively at the end of the short stub and to the outermost end of the member 100. The purpose of the element 104 will be explained hereinafter.

An elongated I-beam 106 also extends between the A-frame 84, 86 and is mounted atop and connected to the upper rails 92, 98 thereof.

Apparatus 20 is a mobile unit, and to this end is provided with an elongated, lowermost, transversely extending axle 108 having wheels 110, 112 secured to the outermost ends thereof. The axle and wheel assembly is operatively coupled to the lower frame 54 by conventional means, such as schematically illustrated depending struts 114 and leaf spring 116.

Four corner mounted, manually adjustable, ground-engaging leveling jacks 118, 120, 122 and 124 and fixedly secured to the corners of lower frame 54 for stabilizing apparatus 20 in use. The respective jack assemblies are of conventional construction and include (see FIG. 3) an operating handle 126, an elongated, depending, extensible shaft 128, and a ground-engaging pad 130 secured to the lowermost end of the shaft. The operation of these jack assemblies is of course well known and need not be described herein.

Log supporting means 24 include a shiftable rectangular frame 131 made up of a pair of elongated, opposed metallic channels 132, 134, as well as a rearward end channel 136 and front wall 138. The front wall 138 includes three spaced, depending leg sections 140, 141 and 142 (see FIG. 5). A pair of forward, transversely oriented roller wheels 144, 146 are mounted beneath and support the forward end of frame 131. The wheels 144, 146 are rotatably mounted between a pair of depending plates 148, 150 attached to the underside of frame 131 and particularly to the side rails 132, 134. The wheels 144, 146 are peripherally grooved as best seen in FIG. 1, and thereby are designed to engage and roll along the length of the underlying, supporting member 82.

The rearward end of the log supporting frame 131 is similarly supported and includes a pair of spaced, transversely oriented, peripherally grooved wheels 152, 154, supported on cross plates 156, 158 secured to the underside of the rails 132, 134. The wheels 152, 154 are designed to engage and roll along the length of the underlying support member 80.

Log supporting means 24 further includes a first, stationary, log-engaging support 160 and a second, rearward, shiftable log-engaging follower support 162. The first support 160 (see FIGS. 5 and 7) includes an elongated, transversely extending plate 164 having a series of upwardly extending, pointed studs 166 mounted thereon. The plate 166 is supported atop front wall 138 on two laterally spaced pairs of upright support bars 168, 170, and 172, 174. The support bars 168, 170 are in juxtaposed relationship and are disposed adjacent the rearward face of the wall 138, whereas pair 172, 174 are similarly disposed adjacent the forward face of the wall 138. A forward guide lug 176 is attached to and extends outwardly from the forward face of central leg section 141 between the bars 172, 174, in order to guide vertical travel of the latter. Likewise, a rearward guide lug 178 is attached to the rear face of central leg section 141 between the bars 168, 170, for a similar purpose.

The support bars 168, 170 and 172, 174 are selectively vertically shiftable in unison by means of elongated operating lever 180. The lever 180 is pivotally secured to leg section 142 as at 182, and extends beneath the opposed pairs of support bars for engagement therewith. An outwardly extending operating handle 184 is secured to the lever 180. Turning to FIG. 6, it will be observed that a latch bar 186 is provided on the handle 184 for selective raising and lowering of lever 180. Specifically, the bar 186 includes a finger opening 188 and a locking element 190 on the opposite end thereof. The bar 186 passes between a pair of mounting projections 192, 194, and has a helical spring 196 disposed about the shaft and in engagement with the opposed projections 192, 194. It will further be observed that the adjacent surface of depending leg section 140 is configured to present a series of teeth 198. As is readily apparent from a study of FIG. 6, the locking element 190 is configured to engage one of the teeth 198 for locking lever 180 in a desired position. It is equally obvious that unlatching is achieved simply by pulling the latch bar 186 leftwardly as viewed in FIG. 6, so that handle 184 can be pivoted upwardly or downwardly. This in turn serves to raise or lower the plate 164 and log-engaging studs 166 thereon. In essence, this mechanism permits selective vertical shifting of the forward log-engaging support.

Figure 7:
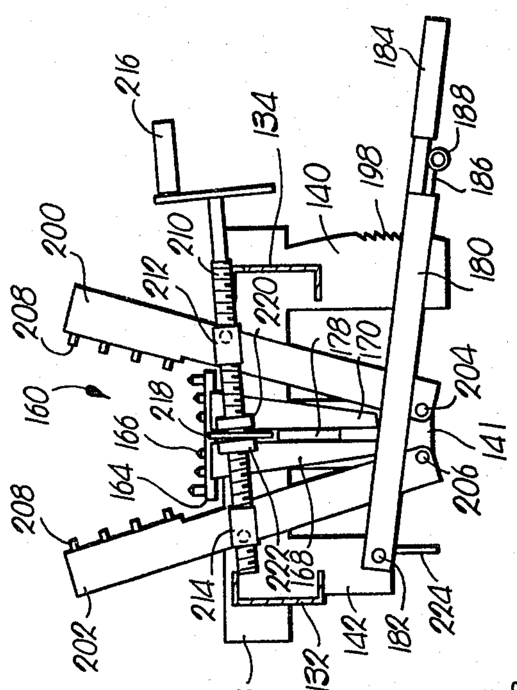
FIG. 7 is a fragmentary vertical sectional view illustrating in detail the forward log-engaging support and associated structure.

The forward support further includes a pair of upright, pivotal, log-engaging stabilizing arms 200, 202. The lowermost end of each arm 200, 202 is pivoted to central leg section 141 as at 204, 206, such that the arms can be pivoted inwardly and outwardly relative to each other as desired. Each arm also includes a series of spaced, log-engaging studs 208 on the inner face thereof for log stabilizing purposes. Selective movement of the arms 200, 202 is achieved through use of elongated, axially rotatable adjustment screw 210. As best seen in FIG. 7, the screw 210 is received within threaded sleeves 212, 214, respectively mounted on the arms 200, 202, and is operated by a handle 216. The screw also passes through a metallic loop 218 mounted on the rearward face of wall 138 between the bars 168, 170. The screw further has collars 220, 222 respectively mounted on the screw on opposite sides of loop 218. As will be readily apparent from a study of FIG. 7, rotation of handle 216 and thereby screw 210 serves to pivot the arms 200, 202 either toward or away from each other.

It will also be seen that a depending pin 224 is secured to the lower margin of leg section 142. The purpose of this pin 224 will be explained hereinafter.

Second log-engaging support 162 includes a shiftable follower carriage adapted to translate along the length of the log-supporting frame 131. In detail, the carriage includes a pair of elongated, transversely extending axle spacer 226, 228. Two axle shafts 229 are respectively disposed beneath the spacers 226, 228, and have a wheel 230 rotatably mounted on the axle shafts 229. The shafts 229 are interconnected by means of a plate 232, and the latter supports a transversely extending block 234. The block 234 is equipped with a series of spaced, upstanding, log-engaging studs 236. The wheels 230 of each adjacent pair (see FIG. 2) respectively ride in the recesses presented by the channel rails 132, 134, so as to render the carriage shiftable along the length of these channels.

Log loading means 28 include a conventional winch assembly 238 having a rotatable drum 240 and a cable 242 wrapped therearound. The assembly 238 further includes an upper mounting plate 244 having two spaced pairs of opposed, upstanding, wheel-supporting members 246 secured thereto. A separate wheel 248 is rotatably attached to each member 246, and the wheels 248 in turn engage the lower, transversely extending flange of I-beam 106 (see FIG. 3). In this fashion the winch assembly 238 can be manually shifted along the length of the I-beam 106. Adjustable limit stops 250, 252 are secured to the lower flange of I-beam 106, in order to limit the extent of travel of the assembly 238.

Overall log loading assembly 28 also includes a pair of spaced, side-by-side, laterally extending, log-engaging slides 254 and 256. Each slide is formed of tubular metallic stock and includes a lowermost, ground-engaging section 258, 260 pivotally connected to the corresponding slide 254, 256. In addition, the slides include uppermost, arcuate, terminal sections 262, 264 pivoted to the upper ends of the corresponding slides 254, 256. It will be noted in this regard that the upper sections 262, 264 are pivotal between a first position above and overlying the log-supporting structure heretofore described, to a second, retracted, log-clearing position depicted in bold lines in FIG. 3. Each slide 254, 256 includes a brace 266 extending inwardly towards the main frame structure of device 20 and connects to a depending mounting rail 268 coupled to the upper end of the corresponding slide. Each mounting rail 268 is in turn mounted to side rail 58 of frame 54. Finally, cross braces 269 are connected between the slides 254, 256 and between the extensions 262, 264, for strengthening the assembly.

Cutting means 30 includes a conventional, circular saw blade 270 mounted for rotation in the usual fashion on shaft 272 and partially covered by a guard 274. It is noted in this respect that the blade is mounted transversely within apparatus 20, i.e., transverse to the longitudinal axis of the log-supporting frame 131.

Saw blade 270 is powered for rotation thereof through shaft 276 adapted to be connected to the power takeoff of a tractor (not shown). The shaft 276 is in turn operatively connected to the shaft 272 by means of conventional drive belt and pulley assembly 278. Referring to FIG. 2, it will be seen that shaft 272 is rotatably supported by spaced bearings 280, and that these bearings are in turn mounted on upright support 282. The latter support is welded to transverse plate 284 which extends from and is connected to the rails 50, 53.

Cutting means 30 also includes structure for manual movement of the log-supporting frame 131 and associated structure towards and away from blade 270. To this end, an elongated, upright, slotted standard in the form of a channel 286 is affixed to rail 132. A slot 288 is provided along the length of the channel, and moreover the outwardly extending flanges thereof are notched as at 290 to present a series of spaced notches or indentations along the length of the channel.

An elongated, log-engaging arm 292 is pivotally secured to the channel 286 and has a series of spaced, log-engaging projections 294 mounted on the underside thereof. The arm 292 has a transversely extending stub shaft 296 secured thereto which is sized to be received within the corresponding notches 290 in channel 286. An elongated bolt 298 extends through the slot 288 and is attached to stub shaft 296, which is in turn attached to arm 292. A spring 300 is captured between the head of the bolt 298 and the back wall of the channel 286. In this fashion the arm 292 is permanently affixed to the channel 286, but is shiftable vertically therealong and can seat, by means of stub shaft 296, in the spaced notches 290. In this way the arm 292 can be raised or lowered to accommodate different diameter logs, as will be explained hereinafter. The outermost end of the arm 292 is equipped with a handle 302, and tether means 304 is provided for holding the arm 292 in an elevated, out of the way position when not in use (illustrated in phantom in FIG. 3).

The cutting means 30 advantageously includes a gauge stop for the log 26, in order to limit the axial length of the cut segments. Preferably, the gauge stop includes a rotatable wheel 306 mounted for rotation about an upright axis on shaft 308. The shaft 308 is in turn supported between spaced plates 310, 312 respectively oriented above and below the wheel 306. A cushioning spring 314 is disposed about shaft 308 and is captured between plate 312 and the underside of wheel 306. The inboard ends of the plates 310, 312 are coupled to an upright pivot pin 316. The opposite ends of the plates 310, 312 are interconnected by means of a short plate 318 which has a depending latching pin 320 and a handle 321 secured thereto. A horizontally extending plate 322 having a series of spaced apertures therethrough is located directly beneath the pin 320 positioned to receive the latter. The plate 322 is supported by upright mounts 324 secured to the frame structure. As can be appreciated from the foregoing, gauge wheel 306 is adjustably mounted for movement toward and away from the blade 270, so as to adjust the spacing between the blade and the wheel; this in turn fixes the axial length of the finished cut log segments.

Figures 10, 11, 12, 13:
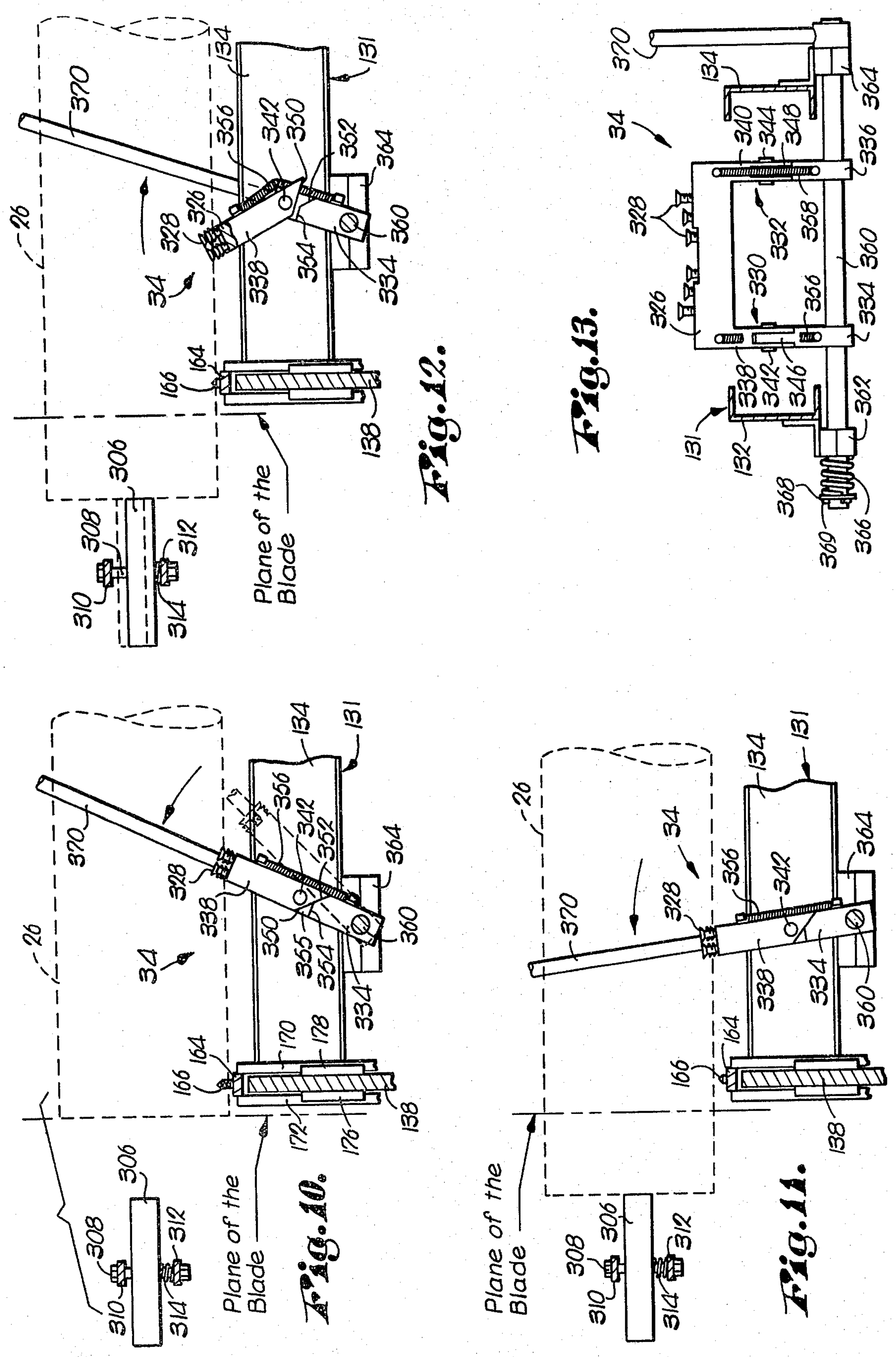
FIG. 10 is a somewhat schematic longitudinal vertical section depicting the log shifting means of the invention and illustrating the same in the initial stages of log shifting.
FIG. 11 is a view similar to that of FIG. 10 but illustrates a log lifted and shifted to the stop wheel gauge.
FIG. 12 is a view similar to that of FIGS. 10 and 11 and illustrates the log shifting mechanism in its folded configuration during retraction thereof.
FIG. 13 is a vertical sectional view somewhat schematic in nature, illustrating the details of construction of the log shifting means.

Log shifting means 34 (see FIGS. 10–13) is mounted on log-supporting frame 131 adjacent the forward end thereof. In particular, the means 34 include a transversely extending segment 326 having a series of upstanding, adjustable, laterally spaced, log engaging screws 328 mounted on the upper surface thereof. The segment 326 is supported at the ends thereof by elongated, depending elements 330, 332. Each element includes a lowermost member 334, 336, and a corresponding upper member 338, 340. The members 334, 338 are interconnected by means of pivot pin 342, whereas the members 336, 340 are interconnected by means of pivot pin 344. To this end, the upper members 338, 340 are bifurcated, whereas the corresponding lower members 334, 336 include an upwardly extending tang 346, 348 received within the bifurcation of the attached upper member. In addition, as best seen in FIG. 12, the lowermost surface of each of the bifurcations of each upper member is configured to present an oblique surface 350. The upper surface of each adjacent lower member 334, 336 on opposite sides of the associated tang presents a first surface 352 which is obliquely oriented at an angle such that, when the upper and lower members are in axial alignment, the surfaces 350, 352 engage. In addition however, a second surface 354 is provided which intersects each oblique surface 352 and extends forwardly therefrom. The surfaces 354 are substantially horizontal such that, when the upper and lower members are in alignment, (see FIGS. 10 and 11), a triangular space 355 is defined on both sides of the upstanding tangs 346, 348 between the surfaces 354 and the upper portions of the surfaces 350. This configuration of the upper and lower members of the elements 330, 332 in effect presents a knee-like joint which allows only unidirectional pivoting of the upper member relative to the lower members. Finally, it will be observed that an elongated biasing spring 356 is operatively connected to the rearward faces of the members 334, 338, and likewise a spring 358 is operatively connected to the rear faces of the upper and lower members 336, 340. The respective springs 356, 358 serve to bias the corresponding upper and lower members to their axially aligned rest position depicted in FIGS. 10, 11 and 13.

The lowermost members 334, 336 are fixedly secured to an elongated, transversely extending pivot shaft 360 which extends between the rails 132, 134. The shaft 360 is journaled on spaced bearings 362, 364, which are respectively secured to the side rails 132, 134. A helical biasing spring 366 is disposed about the end of shaft 360 outboard of bearing 362, and is retained in place thereon by means of retainer washer 368 and pin 369. An elongated, upright operating handle 370 is secured to the opposite outboard end of shaft 360, adjacent bearing 364.

The log segment receiving and conveying means 32 broadly includes a conventional powered conveyor belt assembly 372 having at least a portion thereof operatively mounted beneath the saw blade 270 for receiving cut log segments 36. In addition, the means 32 includes structure 374 for receiving cut log segments and depositing the same onto the conveyor assembly 372 without damaging the latter.

Conveyor assembly 372 advantageously is a segmented unit having an elongated, generally horizontally disposed conveyor section 376 beneath blade 270, with one or more interconnected conveyor sections 378 coupled to the section 376 for transporting cut log segments away from device 20. A brace arm 379 coupled to frame assembly 22 serves to support the section or sections 378 (see FIG. 3). The respective conveyor sections are conventional, and each include a segmented conveying belt 380 trained about appropriate supports 382 and powered by the usual drive (not shown).

The segment receiving structure 374 (see FIGS. 8–9) include a segment catcher 386 disposed between blade 270 and conveyor section 376. The catcher includes a plurality of upright bars 388 which are spaced apart and interconnected by means of upper and lower bars 390, 392. The bars 388 are configured to present an upwardly opening segment-engaging surface in the form of a recess 394 at the lowermost end of the catcher 386. Catcher 386 is pivotally mounted for rotation about a generally horizontal axis. To this end, an elongated mounting rod 396 is welded to the rear surfaces of the bars 388. The rod 396 is mounted for axial pivoting thereof by means of respective bearing assemblies 398, 400. The bearing assembly 398 is of the pillow block variety and includes a pair of depending, spaced helical cushioning springs 402 for absorbing shocks imparted to the catcher 386 by falling log segments. As best viewed in FIG. 5, bearing assembly 398 is mounted on side rail 70; similarly, bearing assembly 400 is operatively mounted on side rail 68 of inner sub-frame 66.

Biasing means for the catcher 386 is provided in the form of a counterweight 408. This counterweight is attached to shaft 410, which is in turn connected to a mounting plate 412. The plate 412 is welded to one of the catcher-defining bars 388. The counterweight 408 serves to bias the catcher 386 to an upright, segment-receiving position best illustrated in FIG. 8.

An elongated, obliquely oriented metallic stem 414 is welded to the upper rearward corner of plate 412. An arcuate, catcher-righting bar 416 is in turn welded to the outermost end of stem 414. The bar 416 and pin 224 hereinbefore described (mounted on depending leg section 142 of plate 138) are cooperatively configured and arranged to interengage during the log cutting sequence for positively righting the catcher 386 for receiving log segments. This operation will be more fully described hereinafter.

As noted above, device 20 is especially designed to be used in the field. Accordingly, appropriate connection arms 418, 420 and 422 are respectively pivotally attached to the forward ends of the rails 68, 70 (in the case of arms 418 and 422) and to a central mount 424 secured to cross rail 50 (see FIG. 1). The separate connection arms 418–422 are designed to be secured to a tractor in the known manner, so that the entire apparatus 20 can be towed to a field site.

In the use of device 20, the same is first conventionally mounted onto a tractor using the arms 418–422 for this purpose. Also, the terminal sections 258, 260 of the respective log engaging slides 254, 256 are pivoted upwardly to clear the ground, and conveyor supporting arm 379 is employed to hold conveyor section or sections 378 in an elevated orientation. In this condition, the entire apparatus 20 can be towed to the cutting site.

At the site, the separate jacks 118–124 are lowered as necessary to level and stabilize the unit. The ground-engaging sections 258, 260 are pivoted to their operative position, and conveyor section or sections 378 are oriented and supported as necessary. For example, if a truck is to be used to haul away the cut log segments, the sections 378 can be used in the elevated FIG. 3 position for conveying the log segments up to a loading level adjacent the truck.

At this point the drive for the overall conveyor belt assembly 372 is started, the power takeoff (not shown) from the tractor is coupled to the shaft 276, and winch assembly 238 is connected to an appropriate source of power.

The device 20 is now ready for log cutting operations. The first step in such operations is to move a log adjacent the lower ends of the ground-engaging sections 258, 260, with the log being in general alignment with the overall device. Cable 242 is then lowered in the usual fashion and wrapped around the log by using the hook affixed to the cable. The log 26 is next elevated using the winch assembly 238 and the slides 254, 256. That is to say, the log 26 is drawn up the slide until it passes the uppermost ends of the inwardly extending upper terminal sections 262, 264. When the log passes off of these terminal sections, unrestricted movement thereof is restrained because of the adjacent elongated backstop element 104; it will be observed in this respect that the element is located relative to the upper ends of the slides so as to prevent undue swinging or other movement of the log.

The next step involves pivoting of the upper terminal sections 262, 264 to the outwardly extending, log-clearing position thereof illustrated in bold lines in FIG. 3. Inasmuch as the log at this time is close to a plumb position in relationship to the winch assembly 238, it remains virtually motionless against the element 104.

The shiftable log-supporting carriage is next moved to a position for supporting the log 26 adjacent the end thereof remote from saw blade 270. Additionally, log shifting means 34 is oriented in its rest position illustrated in FIG. 10, and the stabilizing arms 200, 202 are pivoted open.

The operator next lowers log 26 using the winch assembly 238 to a point where the log is supported by the studs 236 of the shiftable carriage, and the studs 166 forming a part of the forward log-engaging support. Handle 216 is next manipulated in order to draw the stabilizing arms 200, 202 together to a point adjacent log 26.

Gauge wheel 306 is then set using handle 321 to rotate the gauge wheel assembly about pivot pin 316 until an appropriate aperture in plate 322 is reached, whereupon locking pin 320 is employed to lock the gauge wheel 306 in the desired position.

The user next grasps handle 370 associated with the log shifting means 34 and rotates the handle towards saw blade 270 until the forward butt end of log 26 comes into contact with gauge wheel 306. At this point the handle 370 is pulled rearwardly to return the log advancer to its original rest position. The operation of the log shifting means 34 is illustrated in detail in FIGS. 10–12. Specifically, in the rest position thereof illustrated in phantom in FIG. 10, the transverse segment 326 is disposed against the upper surfaces of the rails 132, 134 beneath log 26. When handle 370 is grasped and shifted forwardly, the log-engaging screws 328 first make contact with the underside of log 26. Continued movement of the handle 370 lifts the log slightly out of contact with the projections 166, and thence moves the log forwardly towards gauge wheel 306. Such forward movement is greatly facilitated by virtue of the shiftable log supporting carriage associated with the log-supporting means 24, as will be readily understood.

Forward movement of the handle 370 continues until the butt end of log 26 strikes the wheel 306. Any undue forces on the wheel 306 in this regard are absorbed by the helical spring 314 heretofore described. The operator then pulls handle 370 rearwardly (FIG. 12). This causes the upper members 338, 340 to pivot in a counterclockwise action as viewed in FIG. 12 against the bias of the springs 356, 358, much in the manner of a knee joint. In effect, the log-engaging shifter collapses by the pivoting of the elements 338, 340, such that log 26 drops down and reengages the projections 166. Continued rearward movement of the handle 370 has the effect of pulling the elements 330, 332 and the connected segment 326 back towards the original rest position thereof. When sufficient clearance has been achieved between the overlying log and the screws 328, the springs 356, 358 serve to pull the upper portion of the log-engaging mechanism back to the rest position thereof, i.e., to a position wherein the lower members 334, 336 are in substantial alignment with the corresponding upper members 338, 340. Spring 366 further biases the overall assembly to the rest or neutral position thereof.

With the butt end of log 26 resting against gauge wheel 306, the handle 216 is rotated to draw the arms 200, 202 into supportive engagement with opposed surfaces of the log. The next step in the operation involves cutting the log 26 to present a disc-like segment 36. First, arm 292 is oriented as best viewed in FIG. 5 for engaging the upper surface of log 26. To this end, the arm 292 may be adjusted upwardly or downwardly simply by pulling outwardly on the arm, shifting it is desired, and inserting stub shaft 296 into a desired set of notches 290. Spring 300 serves to releasably maintain the arm 292 in any given desired vertical position.

After arm 292 is properly positioned, it is pivoted downwardly through use of handle 302, and rotation of saw blade 270 is commenced. Cutting is accomplished by grasping handle 302 and pushing log supporting frame 131, and thereby log 26, into the rotating blade 270. Such lateral shifting is permitted by virtue of the frame supporting wheels 144, 146 and 152, 154 which respectively roll along the length of the members 82, 80. After the cutting sequence is completed, the log supporting frame is withdrawn by pulling backwardly on the handle 302.

The cut segment 36 falls under the influence of gravity and first encounters catcher 386 disposed below the blade 270 (see FIGS. 8-9). The falling segment 36, when it engages the catcher, pivots the latter about an axis presented by the rod 396. As shown in FIG. 9, the catcher 386 pivots forwardly and in effect turns the segment 36 such that the planar faces 38, 40 thereof overlie the belt 380 of conveyor section 376. In this manner the segment is safely and automatically dropped onto the underlying conveyor without damaging the latter. Of course, the described spring-cushioned bearings supporting rod 396 absorb the shock loads delivered to the catcher 386 by the falling segment.

Figure 8:
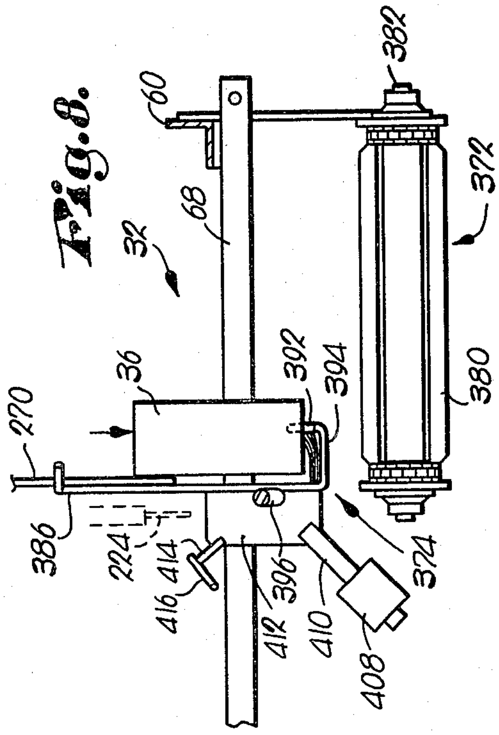
FIG. 8 is a somewhat schematic view of the log segment receiving and conveying mechanism of the invention.
Figure 9:
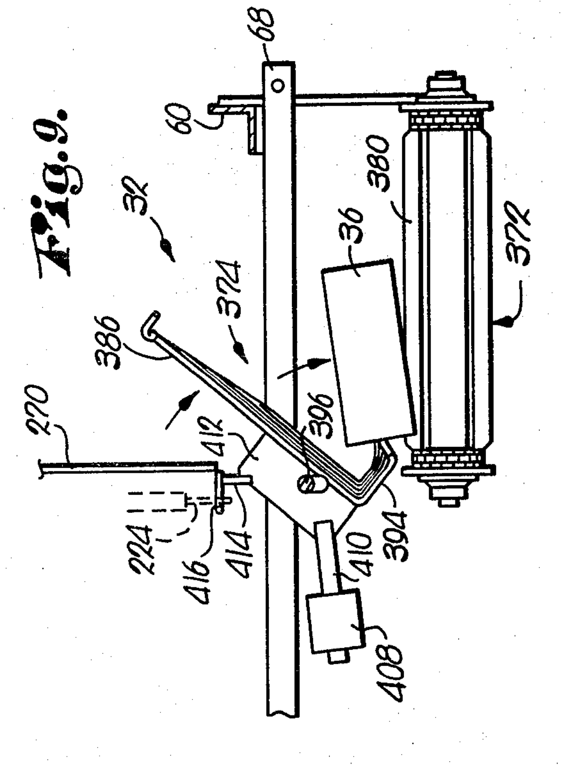
FIG. 9 is a view similar to that of FIG. 8, but illustrating the operation of the log segment-receiving catcher forming a part of the overall mechanism.

After operation of the catcher is completed, counterweight 408 serves to bias the catcher back to its original, upright rest position depicted in FIG. 8. In the event that the catcher becomes stuck for any reason in its pivoted. FIG. 9 position, cooperating pin 224 mounted on leg section 142 and arcuate bar 416 mounted on the catcher come into play. Specifically, the pin 224, as it travels with log supporting frame 131 on the return thereof after segment cutting is completed, engages the arcuate bar 416 and rights the catcher 386, else return movement of the frame 131 is stopped. Thus, proper positioning of the underlying catcher for the next cut is assured in all circumstances.

Cutting of log 26 into a series of segments 36 proceeds as described until the entire log is divided. Broadly speaking, the operation involves opening of the arms 200, 202, shifting of a log until the forward butt end thereof engages wheel 306 (using log shifting means 34), retightening the arms 200, 202 for stabilization purposes, pivoting the arm 292 into engagement with the upper surface of the log and using handle 302 to push the shiftable frame 131 and log 26 into blade 270, whereupon the same handle is used to withdraw the frame and log from the immediate vicinity of the blade. Of course, final handling and conveying of the cut log segments is completely automated, inasmuch as catcher 386 and the underlying conveyor apparatus normally require no operator attention.

Among the many advantages of the present invention is the ability to safely handle irregularly shaped logs. Specifically, in the event such a log is encountered, it is only necessary to manipulate handle 184 to thereby raise or lower the forward support 160 in order to accommodate the irregularity. Thus, positive support and stabilization is provided irrespective of log shape.

Having thus described the invention, what is claimed as new and desired to be secured by Letters Patent is:

1. Handling apparatus for an elongated object such as a log or the like, comprising:

means for supporting said object along the length thereof; and means for incrementally axially and forwardly shifting said object as desired, said shifting means including an object-shifting member disposed below said object and having a lower portion, an upper portion, means carried by said upper portion for engaging said object, and means pivotally coupling the upper and lower portions; and means operatively connected to said member for selective fore and aft pivotal movement thereof about an axis transverse to the longitudinal axis of said object, said coupling means including structure for preventing pivoting of said upper and lower portions relative to each other during pivoting of the member in a forward direction for said forward axial shifting of said object, and for permitting pivoting together of the upper and lower portions upon rearward pivoting of the member in a direction opposite to said forward direction, said coupling structure including complementary, adjacent, obliquely oriented engagement surfaces on said upper and lower portions respectively, said surfaces being cooperatively arranged for collapsing together of said upper and lower portions upon rearward shifting of said member to an extent to clear said object.

2. Apparatus as set forth in claim 1, including means biasing said portions into aligned relationship with one another.

3. Handling apparatus for an elongated object such as a log or the like, comprising:

means for supporting said object along the length thereof;

means for incrementally axially and forwardly shifting said object as desired, said shifting means including an object-shifting assembly including a pair of laterally spaced apart, generally side-by-side object-shifting members, and elongated object-engaging means spanning the lateral distance between said members and being operably coupled thereto, said members each including a lower portion, an upper portion, and means pivotally coupling the upper and lower portions, said elongated object-engaging means including upstanding structure thereon for engaging said object and presenting outboard engagement regions adjacent said members and inboard engagement regions relatively closer to the center of said elongated object-engaging means than said outboard regions, said outboard regions being vertically spaced above aid inboard regions whereby said upstanding structure defines a cradle-like area for supporting said object to be shifted; and means operatively connected to said members for selective fore and aft pivotal movement thereof about an axis transverse to the longitudinal axis of said object, said coupling means including structure for preventing pivoting of said upper and lower portions during pivoting of the members in a forward direction for causing said object-engaging means to engage said object and forwardly axially shift the object, and for permitting pivoting together of the upper and lower portions upon rearward pivoting of the members in a direction opposite said forward direction for causing said object-engaging means to effectively clear said object during such rearward pivoting.

* * * * *